(12) United States Patent
Sakuma et al.

(10) Patent No.: US 10,723,364 B2
(45) Date of Patent: Jul. 28, 2020

(54) INFORMATION PROVIDING SYSTEM AND VEHICLE

(71) Applicant: TOYOTA JIDOSHA KABUSHIKI KAISHA, Toyota-shi, Aichi-ken (JP)

(72) Inventors: Satoru Sakuma, Nagakute (JP); Shuhei Yamamoto, Aichi-ken (JP); Munehiro Kamiya, Anjo (JP); Hideo Hasegawa, Nagoya (JP); Shinji Kurachi, Nagoya (JP); Tomoya Shimizu, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/169,359

(22) Filed: Oct. 24, 2018

(65) Prior Publication Data

US 2019/0126943 A1 May 2, 2019

(30) Foreign Application Priority Data

Oct. 26, 2017 (JP) .................................. 2017-206949

(51) Int. Cl.
*B60W 50/14* (2020.01)
*G06Q 50/30* (2012.01)
*H04L 29/08* (2006.01)

(52) U.S. Cl.
CPC ............. *B60W 50/14* (2013.01); *G06Q 50/30* (2013.01); *H04L 67/12* (2013.01)

(58) Field of Classification Search
CPC ................................ B60W 50/14; G06Q 50/30
USPC .......................................................... 340/438
See application file for complete search history.

(56) References Cited

U.S. PATENT DOCUMENTS

| 2002/0095246 | A1* | 7/2002 | Kawazoe | B62D 15/025 701/1 |
| 2003/0173127 | A1* | 9/2003 | Noecker | B60K 31/0008 180/167 |
| 2005/0065711 | A1* | 3/2005 | Dahlgren | G07C 5/008 701/117 |
| 2008/0258884 | A1* | 10/2008 | Schmitz | G01S 13/931 340/425.5 |
| 2010/0085171 | A1* | 4/2010 | Do | G08B 21/06 340/426.1 |

FOREIGN PATENT DOCUMENTS

JP 2009-096248 A 5/2009

* cited by examiner

*Primary Examiner* — Fabricio R Murillo Garcia
(74) *Attorney, Agent, or Firm* — Hunton Andrews Kurth LLP (57) ABSTRACT

An information providing system includes a plurality of vehicles, and a server configured to communicate with the plurality of vehicles. A vehicle-side controller of each of a plurality of first vehicles of the plurality of vehicles determines whether or not an act detected by an act detector is an abnormal act that meets a predetermined condition, and, when the vehicle-side controller determines that the act is the abnormal act, the vehicle-side controller transmits, to the server, abnormal act occurrence information including a position of each first vehicle detected by a position detector. A server-side controller collects the occurrence information transmitted from the first vehicles as collected information, and transmits the collected information to a second vehicle of the plurality of vehicles to notify a user of the second vehicle of the collected information.

1 Claim, 7 Drawing Sheets

| OCCURRENCE DATE AND TIME | POSITION | VEHICLE TYPE | ABNORMAL ACTION TYPE |
|---|---|---|---|
| a (MONTH), b (DAY), c (HOUR), d (MINUTE) | A PREFECTURE, B CITY, C TOWN, m, n | T | VEHICLE THEFT |
| e (MONTH), f (DAY), g (HOUR), h (MINUTE) | D PREFECTURE, E CITY, F TOWN, p, q | U | THEFT FROM VEHICLE |
| i (MONTH), j (DAY), k (HOUR), l (MINUTE) | G PREFECTURE, H CITY, J TOWN, r, s | V | MISCHIEF TO VEHICLE |
| ⋮ | ⋮ | ⋮ | ⋮ |

INFORMATION PROVIDING SYSTEM AND VEHICLE

This nonprovisional application is based on Japanese Patent Application No. 2017-206949 filed on Oct. 26, 2017 with the Japan Patent Office, the entire contents of which are hereby incorporated by reference.

BACKGROUND

Field

The present disclosure relates to an information providing system and a vehicle, and in particular to an information providing system and a vehicle suitable for notifying an abnormal act on the vehicle.

Description of the Background Art

Japanese Patent Laying-Open No. 2009-96248 discloses a vehicular antitheft device configured to distinguish theft from shake which occurs in daily use, and accurately determine a theft state.

SUMMARY

However, in the above system, even when it is determined that an abnormal act on a vehicle such as theft actually occurs, the determined result cannot be utilized for other purposes.

An object of the present disclosure is to provide an information providing system and a vehicle capable of utilizing a determination as an abnormal act on the vehicle for other purposes.

An information providing system in accordance with the present disclosure includes a plurality of vehicles, and a server configured to communicate with the plurality of vehicles. Each of the plurality of vehicles includes a position detector configured to detect a position of the vehicle, an act detector configured to detect an act on the vehicle, and a vehicle-side controller. The server includes a server-side controller.

The vehicle-side controller of each of a plurality of first vehicles of the plurality of vehicles is configured to determine whether or not an act detected by the act detector is an abnormal act that meets a predetermined condition, and, when determining that the act is the abnormal act, transmit, to the server, abnormal act occurrence information including a position of each first vehicle detected by the position detector. The server-side controller is configured to collect the occurrence information transmitted from the first vehicles as collected information, and transmit the collected information to a second vehicle of the plurality of vehicles to notify a user of the second vehicle of the collected information.

With such a configuration, the user of the vehicle can be notified of the collected information of the information on the occurrence of abnormal acts on the vehicles. As a result, an information providing system capable of utilizing a determination as an abnormal act on a vehicle for other purposes can be provided.

Preferably, the server-side controller is configured to specify, using the collected information, a region where there are statistically more abnormal acts than those at other regions, and transmit the collected information to the second vehicle at the specified region to notify the user of the second vehicle of the collected information. With such a configuration, the user of the vehicle at the region where there are many abnormal acts on the vehicles can be notified of the collected information. As a result, the user can take measures against an abnormal act on the vehicle.

Preferably, each of the plurality of vehicles further includes a notification device configured to notify a user of information. The server-side controller is configured to transmit the collected information to the second vehicle. The notification device of the second vehicle is configured to notify the collected information transmitted from the server. With such a configuration, the collected information of the information on the occurrence of the abnormal acts on the vehicles can be notified at the vehicle. As a result, the user driving the vehicle can take measures against an abnormal act on the vehicle.

Preferably, the server-side controller is configured to transmit the collected information to a mobile terminal of the user of the second vehicle to notify the user of the collected information at the mobile terminal. With such a configuration, the collected information of the information on the occurrence of the abnormal acts on the vehicles can be notified at the mobile terminal of the user. As a result, even when the user is not at the vehicle, the user can take measures against an abnormal act on the vehicle.

Preferably, the vehicle-side controller of the second vehicle is configured to transmit, to the server, position information indicating a position of the second vehicle detected by the position detector. The server-side controller is configured to transmit the collected information in vicinity of the position indicated by the position information transmitted from the second vehicle, to the second vehicle. With such a configuration, the user can learn the collected information of the information on the occurrence of the abnormal acts on the vehicles upon request. As a result, the user driving the vehicle can take measures against an abnormal act on the vehicle.

A vehicle configured to communicate with a server in accordance with another aspect of the present disclosure includes a position detector configured to detect a position of the vehicle, an act detector configured to detect an act on the vehicle, a notification device configured to notify a user of information, and a controller. The controller is configured to determine whether or not the act detected by the act detector is an abnormal act that meets a predetermined condition, and, when determining that the act is the abnormal act, transmit, to the server, abnormal act occurrence information including the position of the vehicle detected by the position detector, to be collected and provided as collected information to another vehicle by the server. The notification device is configured to notify the provided collected information.

With such a configuration, a vehicle capable of utilizing a determination as an abnormal act on the vehicle for other purposes can be provided.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure will be described in detail with reference to the drawings. It should be noted that identical or corresponding parts in the drawings will be designated by the same reference numerals, and the description thereof will not be repeated.

Figure 1:
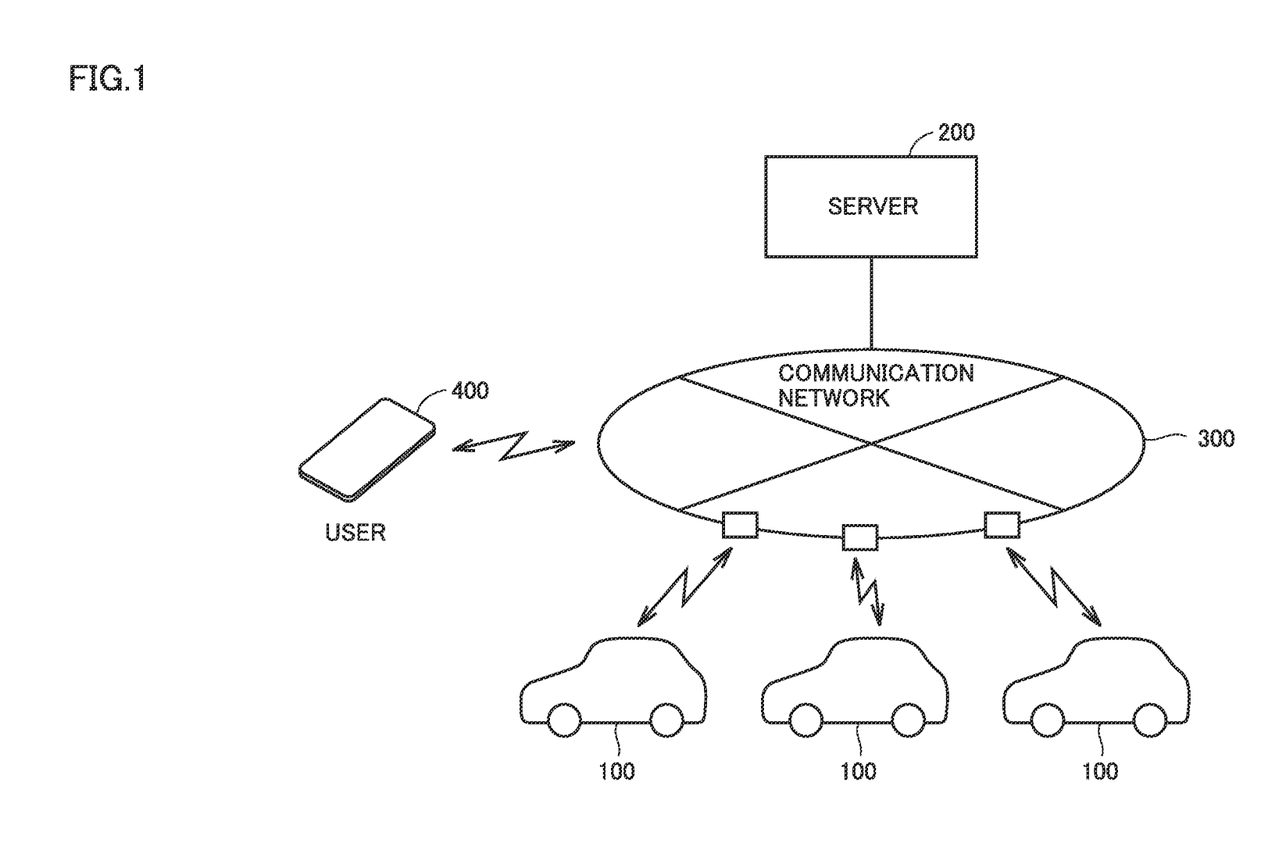
FIG. 1 is a view schematically showing an entire configuration of an abnormal act information providing system according to the present embodiment.

FIG. 1 is a schematic view of an entire configuration of an abnormal act information providing system 10 according to the present embodiment. Referring to FIG. 1, abnormal act information providing system 10 includes a plurality of vehicles 100, a server 200, and a mobile terminal 400. Vehicles 100 and server 200, and mobile terminal 400 and server 200 are configured to communicate with each other via a communication network 300 such as the Internet or a telephone line. Each vehicle 100 and each mobile terminal 400 are configured to transmit and receive information to and from communication network 300 by wireless communication.

As described below, based on information from each vehicle 100, abnormal act information providing system 10 provides information on an abnormal act on vehicle 100 to another vehicle 100 or mobile terminal 400. In the present embodiment, types of the abnormal act include vehicle theft, theft from a vehicle, and mischief to vehicle 100.

Since it is desirable for vehicle 100 in the present embodiment to monitor surrounding circumstances and circumstances inside the vehicle with a vehicle-mounted camera 170 and various sensors even while it is parked, it consumes electric power even while it is parked. Accordingly, vehicle 100 in the present embodiment is preferably a vehicle equipped with a large-capacity power storage device. For example, if vehicle 100 is an electric vehicle, such a vehicle is equipped with a power storage device having a larger capacity when compared with a case where vehicle 100 is not an electric vehicle. Therefore, even when vehicle 100 always monitors the surroundings with vehicle-mounted camera 170 and the various sensors even while it is parked, such monitoring does not have a considerable influence on the SOC (State of Charge) of the power storage device, when compared with a case where vehicle 100 is not equipped with a large-capacity power storage device.

Figure 2:
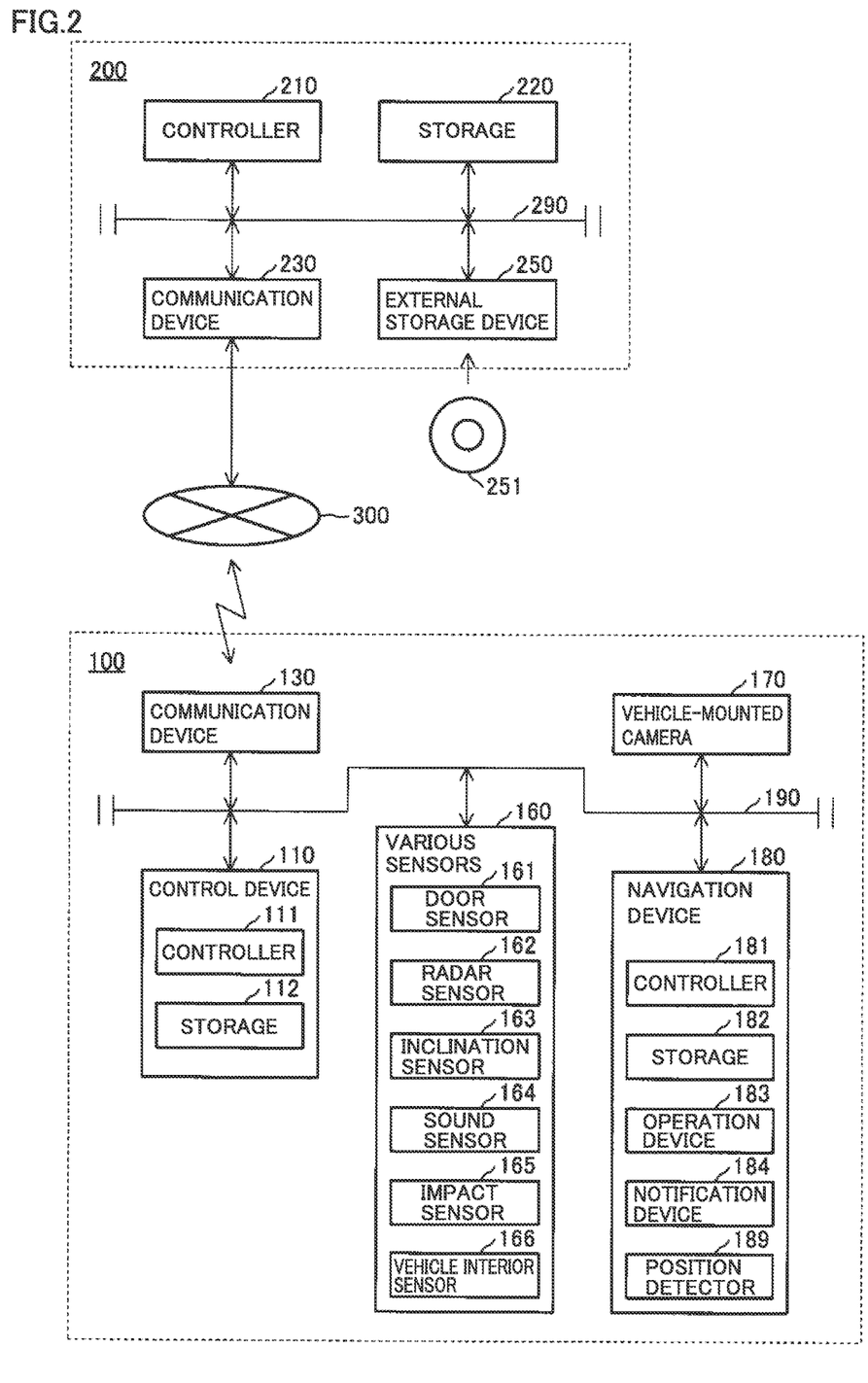
FIG. 2 is a block diagram for illustrating a configuration of a vehicle and a server.

FIG. 2 is a block diagram for illustrating a configuration of each vehicle and the server. Referring to FIG. 2, vehicle 100 includes a control device 110, a communication device 130, various sensors 160, vehicle-mounted camera 170, and a navigation device 180. Control device 110, communication device 130, various sensors 160, vehicle-mounted camera 170, and navigation device 180 are connected with each other through a wired, vehicle-mounted network 190 such as a CAN (Controller Area Network).

Communication device 130 transmits and receives data to and from an external device (for example, server 200) via a communication network 300, using a predetermined protocol. Communication device 130 transmits data received from a device connected to vehicle-mounted network 190, such as control device 110, to the outside, or passes data received from the outside to a device connected to vehicle-mounted network 190, such as control device 110.

Various sensors 160 sense an act on vehicle 100 by a person. Detection signals of various sensors 160 are transmitted to navigation device 180 or control device 110. Various sensors 160 include a door sensor 161, a radar sensor 162, an inclination sensor 163, a sound sensor 164, an impact sensor 165, and a vehicle interior sensor 166. Various sensors 160 may include at least one of these sensors, or may include other sensors.

Door sensor 161 senses opening/closing of doors of vehicle 100. Radar sensor 162 senses abnormal approach to vehicle 100 using an electric wave or the like. Inclination sensor 163 senses inclination of vehicle 100, stores an angle at normal time such as during parking, and, when vehicle 100 is inclined by a predetermined angle or more from the angle at normal time, inclination sensor 163 outputs a signal indicating that vehicle 100 is inclined. Inclination sensor 163 can detect theft of a wheel and theft of vehicle 100 using a wrecker or the like.

Sound sensor 164 senses only abnormal sound in a specific frequency band, such as sound of scratching a key cylinder during picking, and high frequency sound produced when cutting glass to intrude into a vehicle. Impact sensor 165 senses impact on a vehicle body. Vehicle interior sensor 166 senses motion of a person or the like inside a vehicle using a supersonic wave, an infrared ray, or the like.

Vehicle-mounted camera 170 is a CCD (Charge Coupled Device) camera, for example, and is attached to at least one of the front, rear, right, and left of vehicle 100. Vehicle-mounted camera 170 shoots an image around vehicle 100. Data shot with vehicle-mounted camera 170 is transmitted to navigation device 180 or control device 110.

Navigation device 180 includes a controller 181 for controlling entire navigation device 180, a storage 182 for storing predetermined information, an operation device 183 for operating navigation device 180, a notification device 184 for notifying predetermined information of navigation device 180 through display and voice, and a position detector 189 for detecting a position.

Storage 182 includes a RAM (Random Access Memory) used as a workspace necessary to execute a program by controller 181, and a ROM (Read Only Memory) for storing the program to be executed by controller 181. In addition, in the RAM, programs and data for executing predetermined processing are read from the ROM or the like and are stored. Further, a recording medium such as a memory card may be used as an auxiliary storage device for assisting a storage area of the RAM.

Operation device 183 includes a plurality of operation buttons for causing navigation device 180 to perform a predetermined function, and a touch panel formed on a display of notification device 184. An operation signal indicating operation contents input into navigation device 180 by operating the operation buttons and the touch panel of operation device 183 is passed to controller 181.

Notification device 184 includes a liquid crystal display device (hereinafter referred to as an "LCD") having the display, on which the touch panel is formed, and a speaker. The LCD of notification device 184 displays an image received from controller 181 indicating information for navigating vehicle 100 and the operation buttons of the touch panel, and the like. It should be noted that notification device 184 may include another FPD (Flat Panel Display) such as an EL (Electro-Luminescence) display, instead of an LCD. The speaker of notification device 184 outputs a voice signal received from controller 181 as voice.

Position detector 189 detects the position of the vehicle based on an electric wave from a GPS (Global Positioning System) satellite, and passes the detected position information to controller 181.

Controller 181 includes an MPU (Micro Processing Unit) and an auxiliary circuit thereof. Controller 181 controls storage 182, operation device 183, notification device 184, and position detector 189. Controller 181 performs predetermined processing according to the programs and data stored in storage 182. Controller 181 processes data input from operation device 183 or other devices connected to vehicle-mounted network 190 (for example, vehicle-mounted camera 170, control device 110, communication device 130, and the like). Controller 181 causes the processed data to be stored in storage 182, to be notified by notification device 184, or to be output to the other devices.

Specifically, controller 181 performs a variety of navigation processing for vehicle 100 using the position information (GPS information) of vehicle 100 detected by position detector 189. More specifically, controller 181 controls notification device 184 to calculate a traveling route (a scheduled traveling route or a target route) for vehicle 100 from the present location to a destination based on the GPS information of vehicle 100 and road map data stored in storage 182, display information on the target route, and output the information as voice.

Control device 110 is a so-called ECU (Electronic Control Unit), and includes a controller 111 for controlling entire vehicle 100, and a storage 112 for storing predetermined information. Storage 112 is the same as storage 182 of navigation device 180 described above, and thus an overlapped description thereof will not be repeated.

Controller 111 includes an MPU (Micro Processing Unit) and an auxiliary circuit thereof. Controller 111 performs predetermined processing according to programs and data stored in storage 112. Controller 111 processes data input from other devices connected to vehicle-mounted network 190 (for example, communication device 130, vehicle-mounted camera 170, navigation device 180, and the like). Controller 111 causes the processed data to be stored in storage 112, or to be output to the other devices.

Specifically, controller 111 controls devices such as a drive device for a motor generator in response to signals from sensors and the like of vehicle 100, such that vehicle 100 enters a desired state.

Server 200 includes a controller 210, a storage 220, a communication device 230, and an external storage device 250. Storage 220 and communication device 230 are the same as storage 112 of control device 110 and communication device 130 of vehicle 100 described above, and thus an overlapped description thereof will not be repeated.

External storage device 250 includes a storage device such as a hard disk drive, a flexible disk drive, an MO (Magneto-Optical disk) drive, a CD (Compact Disc) drive, a DVD (Digital Versatile Disk) drive, or a memory card reader writer. External storage device 250 magnetically, optically, or electrically records predetermined data or program received from controller 210 in a recording medium 251, or reads the data or program from recording medium 251 and passes it to controller 210. Examples of recording medium 251 include magnetic disks such as a hard disk and a flexible disk, optical disks such as a CD-ROM (Compact Disk Read Only Memory), a CD-R (Compact Disk Recordable), a CD-RW (Compact Disk ReWritable), a DVD-ROM (Digital Versatile Disk Read Only Memory), a DVD-R (Digital Versatile Disk Recordable), a DVD-RW (Digital Versatile Disk ReWritable), a DVD-RAM (Digital Versatile Disk Random Access Memory), a DVD+R, and a DVD+RW, magneto-optical disks such as an MO (Magneto-Optical disk), a memory card, and a USB (Universal Serial Bus) memory.

Controller 210 includes an MPU (Micro Processing Unit) and an auxiliary circuit thereof. Controller 210 controls storage 220, communication device 230, and external storage device 250. Controller 210 performs predetermined processing according to programs and data stored in storage 220. Controller 210 processes data input from communication device 230 and external storage device 250. Controller 210 causes the processed data to be stored in storage 220, to be output from communication device 230 to other devices, or to be stored in recording medium 251 of external storage device 250.

It should be noted that, although server 200 does not include an operation device and a display device in the present embodiment, the present disclosure is not limited thereto, and server 200 may include components of an operation device and a display device. The operation device includes a keyboard and a mouse, and an operation signal indicating operation contents input into server 200 by operating the keyboard and the mouse of the operation device is passed to controller 210. The display device includes an LCD, and the LCD displays an image corresponding to image data received from controller 210.

Figure 3:
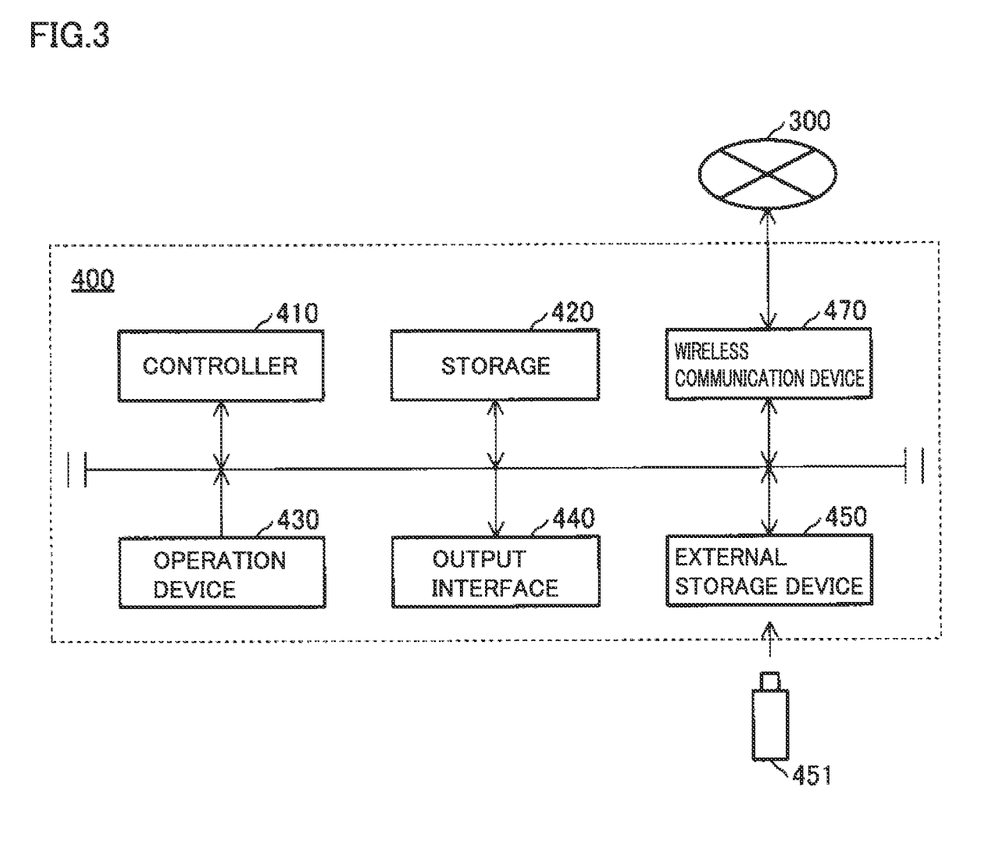
FIG. 3 is a block diagram showing a configuration of a mobile terminal in the present embodiment.

FIG. 3 is a block diagram showing a configuration of mobile terminal 400 in the present embodiment. Referring to FIG. 3, mobile terminal 400 includes a controller 410 for controlling entire mobile terminal 400, a storage 420 for storing predetermined information, an operation device 430, an output interface 440, an external storage device 450, and a wireless communication device 470. It should be noted that, although not shown, mobile terminal 400 also includes other components such as a voice input/output interface for inputting and outputting voice.

Controller 410 includes a CPU (Central Processing Unit) and an auxiliary circuit thereof. Controller 410 controls storage 420, operation device 430, output interface 440, and wireless communication device 470. Controller 410 performs predetermined processing according to programs or data stored in storage 420. Controller 410 processes data input from operation device 430 and wireless communication device 470. Controller 410 causes the processed data to be stored in storage 420, or to be output to output interface 440 and wireless communication device 470.

Storage 420 includes a RAM (Random Access Memory) used as a workspace necessary to execute a program by controller 410, and a ROM (Read Only Memory) for storing the program to be executed by controller 410. In addition, in the RAM, programs and data for executing predetermined processing are read from operation device 430, wireless communication device 470, or external storage device 450, and are stored. Further, a hard disk drive or a memory card may be used as an auxiliary storage device for assisting a storage area of the RAM.

External storage device 450 includes a memory card reader writer. External storage device 450 electrically records predetermined data or program received from controller 410 in a recording medium 451 such as a memory card or a USB (Universal Serial Bus) memory, or reads the data or program from recording medium 451 and passes it to controller 410. It should be noted that external storage device 450 may include a storage device such as a hard disk drive, a flexible disk drive, an MO (Magneto-Optical disk) drive, a CD (Compact Disc) drive, or a DVD (Digital Versatile Disk) drive.

Operation device 430 includes a touch panel and operation buttons for inputting numbers, the alphabet, other characters, and the like, of a telephone number, various types of data, and the like. It should be noted that operation device 430 may include another device for operation. As operation device 430 is operated by a user, an operation signal corresponding to the operation is transmitted from operation device 430 to controller 410. Controller 410 controls devices of mobile terminal 400 in response to the operation signal from operation device 430.

Wireless communication device 470 is controlled by controller 410 to receive a wireless signal from another mobile terminal 400 or a fixed-line telephone of a call partner, via a communication facility of a telecommunications carrier and an antenna. Wireless communication device 470 converts the received wireless signal into a voice signal, and transmits the converted voice signal to the voice input/output interface. Wireless communication device 470 converts a voice signal from the voice input/output interface into a wireless signal, and transmits the wireless signal to other mobile terminal 400 or the fixed-line telephone of the call partner, via the antenna and the communication facility of the telecommunications carrier.

Further, wireless communication device 470 is controlled by controller 410 to receive a wireless signal from an apparatus which can perform data communication, for example, server 200 or other mobile terminal 400, via the communication facility of the telecommunications carrier and the antenna. Wireless communication device 470 converts the received wireless signal into data, and stores the converted data in storage 420, or transmits the converted data to output interface 440 to display the data. Wireless communication device 470 converts data to be transmitted into a wireless signal, and transmits the wireless signal to the server or other mobile terminal 400 to which the data is to be communicated, via the antenna and the communication facility of the telecommunications carrier.

Furthermore, wireless communication device 470 is controlled by controller 410 to exchange data with other apparatuses which can perform network communication, for example, server 200 and other mobile terminal 400, via a public wireless LAN or a wireless LAN for a private network.

Output interface 440 includes a display and a speaker. Output interface 440 is controlled by controller 410 to cause an image signal and a voice signal obtained by converting information received by wireless communication device 470, information stored in storage 420, or information read from recording medium 451 in external storage device 450, by controller 410, to be displayed as an image on the display and to be output as voice from the speaker, respectively.

In a conventional system, even when it is determined that an abnormal act on vehicle 100 such as theft actually occurs, the determined result cannot be utilized for other purposes.

Accordingly, in the present embodiment, a first vehicle 100 determines whether or not an act detected by various sensors 160 is an abnormal act that meets a predetermined condition. When first vehicle 100 determines that the act is the abnormal act, first vehicle 100 transmits, to server 200, abnormal act occurrence information including a position of the first vehicle detected by position detector 189. Server 200 collects the occurrence information transmitted from a plurality of first vehicles 100 as collected information, and transmits the collected information to a second vehicle 100 to notify a user of second vehicle 100 of the collected information.

Thereby, the user of other vehicle 100 can be notified of the collected information of the information on the occurrence of abnormal acts on vehicles 100. As a result, the determination as the abnormal act on vehicle 100 can be utilized for other purposes.

Figure 4:
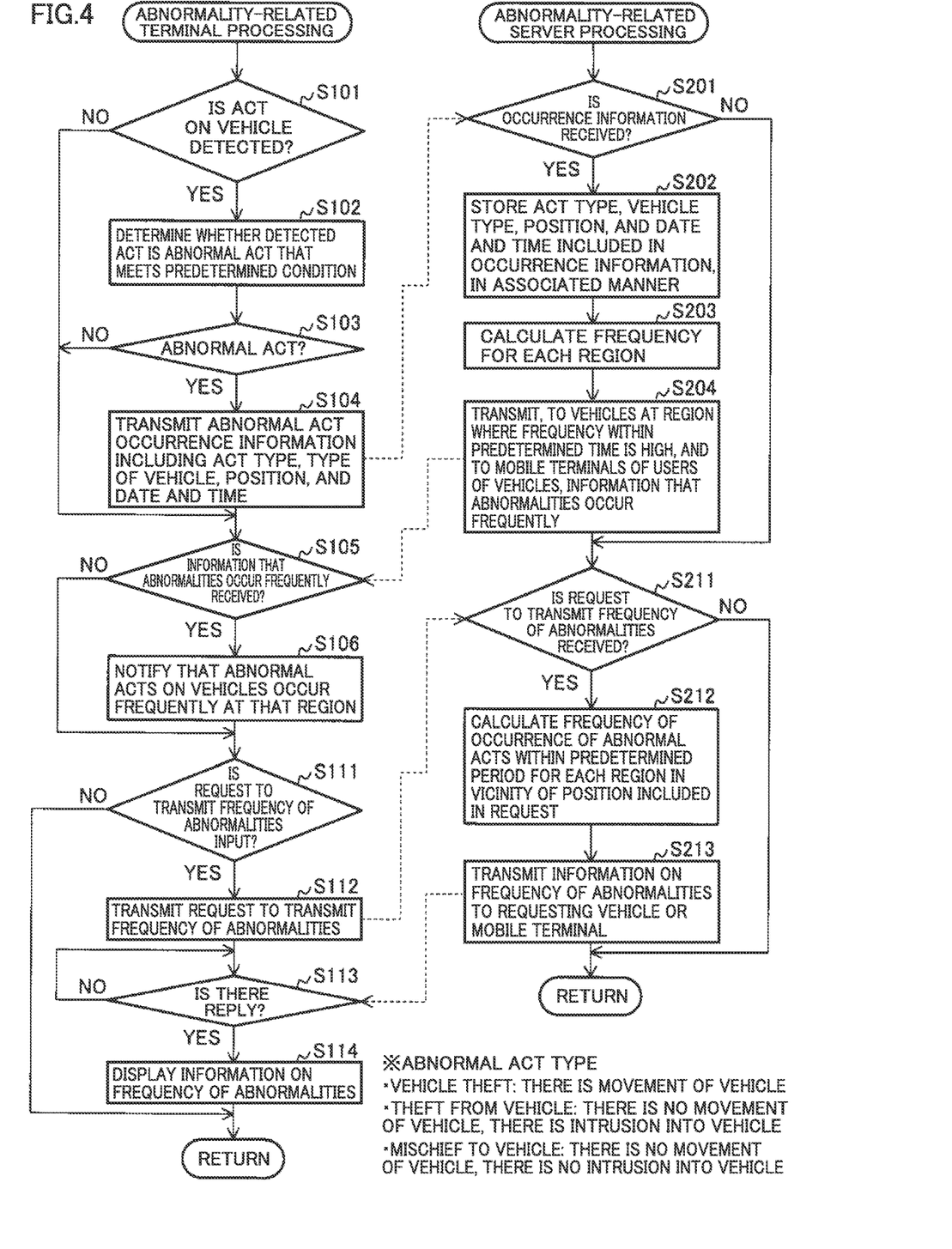
FIG. 4 is a flowchart showing a flow of abnormality-related processing performed in the present embodiment.

FIG. 4 is a flowchart showing a flow of abnormality-related processing performed in the present embodiment. Referring to FIG. 4, when a monitoring mode is set while vehicle 100 is parked, controller 181 of navigation device 180 of vehicle 100 receives the detection signals from various sensors 160, and thereby determines whether or not an act on vehicle 100 by a person or the like is detected (S101). The monitoring mode is a mode for monitoring an abnormal act on vehicle 100, and becomes valid upon a user switching the mode to a valid state when the user parks vehicle 100 and leaves vehicle 100. When controller 181 determines that an act on vehicle 100 by a person or the like is not detected (NO in S101), controller 181 proceeds the processing to be performed to S105.

When controller 181 determines that an act on vehicle 100 by a person or the like is detected (YES in S101), controller 181 determines whether or not the detected act is an abnormal act that meets a predetermined condition (S102). For example, when a condition that radar sensor 162 senses approach of a person or a like, and then sound sensor 164 senses abnormal sound or impact sensor 165 senses impact on the vehicle body, as a predetermined condition, is met, controller 181 determines that mischief to vehicle 100 occurs as an abnormal act. Thus, when the predetermined condition is met in a case where there is no intrusion into the vehicle and there is no movement of vehicle 100, controller 181 determines that mischief to vehicle 100 occurs.

Further, when a condition that radar sensor 162 senses approach of a person or a like, and then sound sensor 164 senses abnormal sound or door sensor 161 senses opening/closing of a door or impact sensor 165 senses impact on the vehicle body, and thereafter vehicle interior sensor 166 senses motion of the person or the like inside the vehicle, as a predetermined condition, is met, controller 181 determines that theft from the vehicle occurs as an abnormal act. Thus, when the predetermined condition is met in a case where there is intrusion into the vehicle and there is no movement of vehicle 100, controller 181 determines that theft from the vehicle occurs in vehicle 100.

Furthermore, when a condition that radar sensor 162 senses approach of a person or a like, and then inclination sensor 163 senses inclination of vehicle 100, as a predetermined condition, is met, controller 181 determines that theft of a component on the outside of vehicle 100 (for example, a wheel, a tire, or the like), which is one type of theft from the vehicle, occurs as an abnormal act. Thus, when the predetermined condition is met in a case where there is no intrusion into the vehicle and there is no movement of vehicle 100, controller 181 determines that theft of a component on the outside of vehicle 100 occurs in vehicle 100.

In addition, when a condition that radar sensor 162 senses approach of a person or a like, and then position detector 189 detects movement of vehicle 100, as a predetermined condition, is met, controller 181 determines that vehicle theft occurs as an abnormal act. Thus, when the predetermined condition is met in a case where there is movement of vehicle 100, controller 181 determines that vehicle theft occurs.

It should be noted that the predetermined condition for an abnormal act may be any other condition as long as it is a condition for determining whether an act is abnormal. For example, when a condition that controller 181 determines from an image shot with vehicle-mounted camera 170 that there is an act that a person is looking into vehicle 100 from a distance undetectable by radar sensor 162, as a predetermined condition, is met, controller 181 may determine that an abnormal act occurs, although such an act is at a stage prior to an abnormal act. In addition, the types of the abnormal act may include any other type as long as it is a type for distinguishing an abnormal act.

Subsequently, controller 181 determines whether or not the abnormal act occurs (S103). It should be noted that, when door sensor 161 senses opening/closing of a door and then the monitoring mode is switched from a valid state to an invalid state within a predetermined time (for example, a time of about 10 to 30 seconds; the predetermined time may be configured to be set by the user), controller 181 may be configured not to determine that the abnormal act occurs in S103. When controller 181 determines that the abnormal act does not occur (NO in S103), controller 181 proceeds the processing to be performed to S105.

When controller 181 determines that the abnormal act occurs (YES in S103), controller 181 transmits, to server 200, occurrence information that the abnormal act occurs, including the type of the occurring abnormal act, the type of the vehicle, the position of the vehicle, and the current date and time (S104). The type of the vehicle is stored beforehand in storage 112 of control device 110, for example. The position of the vehicle is obtained from position detector 189 of navigation device 180. Thereafter, controller 181 proceeds the processing to be performed to S105.

It should be noted that, although not shown in FIG. 4, when it is determined in S103 that the abnormal act occurs, an alarm may be sounded.

Controller 210 of server 200 determines whether or not the occurrence information is received from vehicle 100 (S201). When controller 210 determines that the occurrence information is not received (NO in S201), controller 210 proceeds the processing to be performed to S211.

On the other hand, when controller 210 determines that the occurrence information is received (YES in S201), controller 210 causes storage 220 to store the abnormal act type, the vehicle type, the position, and the occurrence date and time included in the received occurrence information, in an associated manner, as abnormal act information (S202).

Figure 5:
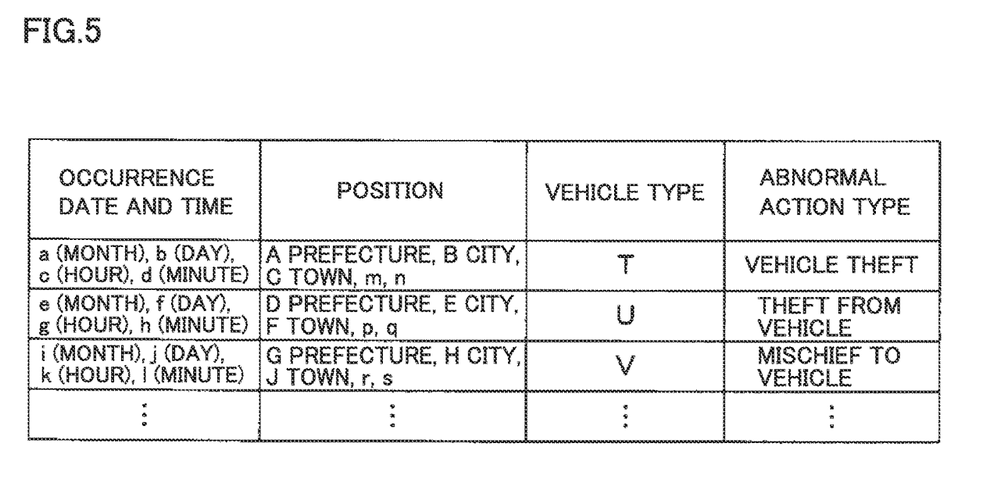
FIG. 5 is a view for illustrating abnormal act information stored in the server in the present embodiment.

FIG. 5 is a view for illustrating the abnormal act information stored in server 200 in the present embodiment. Referring to FIG. 5, for example, when the received occurrence information includes "vehicle theft" as an abnormal act type, "T" as a vehicle type, "A prefecture, B city, C town, m, n" as a position, and "a (month), b (day), c (hour), d (minute)" as occurrence date and time, "a (month), b (day), c (hour), d (minute)" as the occurrence date and time, "A prefecture, B city, C town, m, n" as the position, "T" as the vehicle type, and "VEHICLE THEFT" as the abnormal act type are stored in storage 220 in an associated manner.

Similarly, "e (month), f (day), g (hour), h (minute)" as occurrence date and time, "D prefecture, E city, F town, p, q" as a position, "U" as a vehicle type, and "THEFT FROM VEHICLE" as an abnormal act type are stored in storage 220 in an associated manner. In addition, "i (month), j (day), k (hour), l (minute)" as occurrence date and time, "G prefecture, H city, J town, r, s" as a position, "V" as a vehicle type, and "MISCHIEF TO VEHICLE" as an abnormal act type are stored in storage 220 in an associated manner.

Turning back to FIG. 4, controller 210 uses the abnormal act information stored in storage 220 to calculate the frequency of occurrence of the abnormal acts within a predetermined time (a time in which the abnormal acts on vehicles 100 may continuously occur at a certain region; for example, such as 24 hours) for each region (S203).

Subsequently, controller 210 transmits, to a plurality of vehicles 100 at a region where the occurrence frequency within the predetermined time is higher than a predetermined reference value, and to mobile terminals 400 of users of those vehicles, information that abnormalities occur frequently at the region where the users park vehicles 100 (S204). This reference value is set, for example, to a value which can be determined to be statistically significantly higher than those at other regions. This reference value may also be set empirically. When vehicle theft occurs frequently in one vehicle type, information that vehicle theft occurs frequently in that vehicle type may be transmitted to users of that vehicle type. Thereafter, controller 210 proceeds the processing to be performed to S211.

Controller 181 of navigation device 180 of vehicle 100 different from vehicle 100 which has transmitted the abnormal act occurrence information in S104 determines whether or not the information that abnormalities occur frequently is received from server 200 (S105). When controller 181 determines that the information that abnormalities occur frequently is not received (NO in S105), controller 181 proceeds the processing to be performed to S111.

On the other hand, when controller 181 determines that the information that abnormalities occur frequently is received (YES in S105), controller 181 controls notification device 184 of navigation device 180 to notify through an image and voice that, at present, the abnormal acts on vehicles 100 occur frequently at the region where vehicle 100 is located (S106). Thereafter, controller 181 proceeds the processing to be performed to S111.

It should be noted that, when controller 410 of mobile terminal 400 determines that the information that abnormalities occur frequently is received from server 200 (YES in S105), controller 410 controls output interface 440 of mobile terminal 400 to notify through an image and voice that, at present, the abnormal acts on vehicles 100 occur frequently at the region where vehicle 100 is located.

Figure 6:
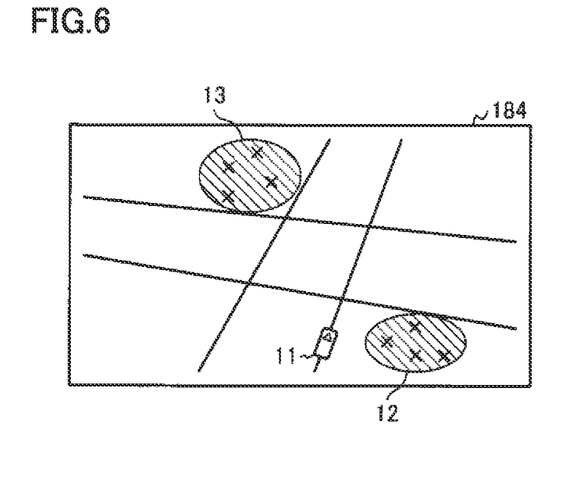
FIG. 6 is a view showing an example of notifying that abnormal acts on the vehicles occur frequently in the present embodiment.

FIG. 6 is a view showing an example of notifying that the abnormal acts on vehicles 100 occur frequently in the present embodiment. Referring to FIG. 6, notifying that the abnormal acts on vehicles 100 occur frequently is performed through an image and voice. As the notifying through an image, for example, an image 11 indicating the position of the vehicle, and hatching images 12 and 13 indicating locations where the abnormal acts on vehicles 100 occur frequently (including marks "x" indicating a plurality of occurrence positions) are displayed on a map of the vicinity of the vehicle (in a range where similar abnormal acts may occur; for example, such as a municipal unit) on the display of notification device 184. As the notifying through voice, for example, voice indicating that the abnormal acts on vehicles 100 occur frequently, such as "Abnormal acts on vehicles occur frequently in the neighborhood", is output.

By receiving such notifying, a user can take measures against an abnormal act on vehicle 100. For example, when the user of vehicle 100 is driving the vehicle, the user can park vehicle 100 so as to avoid the location where the abnormal acts occur frequently. In addition, when the user of vehicle 100 has parked the vehicle, the user can go back to the location where the user has parked the vehicle to check whether an abnormal act does not occur in the vehicle.

Turning back to FIG. 4, next, controller 181 determines whether or not a request to transmit the frequency of occurrence of the abnormal acts is input at operation device 183 of navigation device 180 (S111). When controller 181 determines that the request is not input (NO in S111), controller 181 returns the processing to be performed to a caller of this processing.

On the other hand, when controller 181 determines that the request is input (YES in S111), controller 181 transmits, to server 200, the request to transmit the frequency of occurrence of the abnormal acts, including the current position of vehicle 100 (S112). It should be noted that the request may include the type of the vehicle.

Similarly, in mobile terminal 400, controller 410 determines whether or not a request to transmit the frequency of occurrence of the abnormal acts, and a position or region for which the user wants to know the frequency of occurrence of the abnormal acts are input at operation device 430. When controller 410 determines that the request is input, controller 410 transmits, to server 200, the request to transmit the frequency of occurrence of the abnormal acts, including the position or region for which the user wants to know the frequency.

Controller 210 of server 200 determines whether or not the request to transmit the frequency of occurrence of the abnormal acts is received from vehicle 100 or mobile terminal 400 (S211). When controller 210 determines that the request is not received (NO in S211), controller 210 returns the processing to be performed to a caller of this processing.

On the other hand, when controller 210 determines that the request is received (YES in S211), controller 210 calculates the frequency of occurrence of the abnormal acts within a predetermined period (a statistically appropriate period; for example, such as the latest one month, the latest one year, or the like) for each region having a wide area (for example, a prefecture) including the position included in the request, using the abnormal act information stored in storage 220 (S212).

Subsequently, controller 210 transmits information on the calculated frequency of occurrence of the abnormal acts to requesting vehicle 100 or mobile terminal 400 (S213). When the request includes the vehicle type, controller 210 may calculate the frequency of occurrence of the abnormal acts on that vehicle type, and transmit the calculated frequency of occurrence. Thereafter, controller 210 returns the processing to be performed to the caller of this processing.

Controller 181 of navigation device 180 of vehicle 100 determines whether or not there is a reply, until there is a reply from server 200 (S113). When controller 181 determines that there is a reply (YES in S113), controller 181 controls notification device 184 to notify the information on the frequency of occurrence of the abnormal acts (S114). Thereafter, controller 181 returns the processing to be performed to the caller of this processing.

Figure 7:
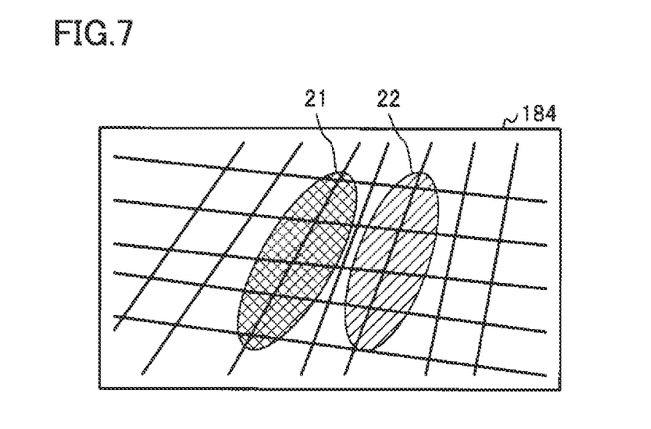
FIG. 7 is a view showing an example of notifying information on the frequency of occurrence of the abnormal acts on the vehicles in the present embodiment.

FIG. 7 is a view showing an example of notifying the information on the frequency of occurrence of the abnormal acts on the vehicles in the present embodiment. Referring to FIG. 7, the information on the frequency of occurrence of the abnormal acts is notified through an image. As the notifying through an image, for example, a hatching image 21 indicating a region having a high frequency of occurrence of the abnormal acts on vehicles 100 (for example, having a frequency of occurrence of the abnormal acts higher than a first reference value) within a predetermined period, and a hatching image 22 indicating a region having a moderate frequency of occurrence of the abnormal acts on vehicles 100 (for example, having a frequency of occurrence of the abnormal acts within a range between the first reference value and a second reference value lower than the first reference value) are displayed on a map of a wide area including the position of the vehicle, on the display of notification device 184.

By receiving such notifying, a user can take measures against an abnormal act on vehicle 100. For example, when the user of vehicle 100 is driving the vehicle, the user can park vehicle 100 so as to avoid the location having a high frequency of occurrence of the abnormal acts (and the location having a moderate frequency of occurrence of the abnormal acts). In addition, when the user of vehicle 100 considers signing a lease for a parking lot for the vehicle, the user can lease a parking lot which is not located at the location having a high frequency of occurrence of the abnormal acts (and the location having a moderate frequency of occurrence of the abnormal acts).

[Variations]

(1) The processing on the vehicle 100 side illustrated in FIG. 4 described above is performed by controller 181 of navigation device 180. However, the present disclosure is not limited thereto, and the processing may be performed by another device of vehicle 100, for example, controller 111 of control device 110. In this case, instead of operation device 183 and notification device 184 of navigation device 180, vehicle 100 may include another operation device and another notification device, and a request may be accepted by the other operation device and a search result may be notified by the other notification device.

(2) In FIG. 4 described above, whether or not an act on vehicle 100 is an abnormal act is determined by vehicle 100, as indicated in S103. However, the present disclosure is not limited thereto, and an act on vehicle 100 may be transmitted to server 200, and whether or not the act is an abnormal act may be determined by server 200.

(3) In the processing illustrated in FIG. 4 described above, whether or not the abnormal act occurs is always monitored while the vehicle is parked, as indicated in S101 to S104. However, the present disclosure is not limited thereto, and whether or not the abnormal act occurs may be monitored at a predetermined interval (for example, every minute) while the vehicle is parked.

(4) Vehicles 100 and mobile terminals 400 to which the information that abnormalities occur frequently is transmitted in S204 of FIG. 4 described above may include vehicle 100 which has transmitted the occurrence information in S201, and mobile terminal 400 of the user of that vehicle 100.

(5) Only a user who has performed user registration beforehand may be allowed to obtain the information on the occurrence of the abnormal acts on vehicles 100 as in S106 and S114 of FIG. 4 described above. In this case, when the user performs user registration, an application program for the abnormality-related terminal processing shown in FIG. 4 is downloaded via communication device 130, and is stored in storage 182 of navigation device 180 of vehicle 100. Thus, when an abnormal act occurs in vehicle 100, information on that fact is transmitted to server 200, and in return, the user of vehicle 100 can obtain the information on the occurrence of the abnormal acts as in S106 and S114.

(6) In the embodiment described above, the processing shown in FIG. 4 is implemented when software is executed by controllers 181 and 210. However, the present disclosure is not limited thereto, and the processing shown in FIG. 4 may be partly or entirely implemented by a dedicated hardware circuit.

(7) In the embodiment described above, the disclosure has been described as abnormal act information providing system 10. However, the present disclosure is not limited thereto, and the disclosure can be considered as a method for providing abnormal act information performed by abnormal act information providing system 10. The disclosure can also be considered as a device such as vehicle 100, server 200, or mobile terminal 400 included in abnormal act information providing system 10. Further, the disclosure can be considered as a method or a program performing processing as shown in FIG. 4 in vehicle 100, server 200, or mobile terminal 400.

In addition, the disclosure can be considered as computer-readable recording medium 251, 451 which records the program. This recording medium 251, 451 may be a medium which stationarily carries a program, including a magnetic tape, a magnetic disk such as a flexible disk or a hard disk, an optical disk such as a CD-ROM, a CD-R, a CD-RW, a DVD-ROM, a DVD-R, a DVD-RW, a DVD-RAM, a DVD+R, or a DVD+RW, a magneto-optical disk such as an MO, a memory card, a USB memory, or the like, or may be a medium which fluidly carries a program such that the program is downloaded from a server such as an ASP (Application Service Provider) via the communication network. In particular, in vehicle 100 not equipped with external storage device 250, 450, a computer-readable recording medium which records the program may be a medium which fluidly carries a program as described above.

(8) The techniques described in the embodiment and the variations are intended to be performed alone or in combination, as far as possible.

[Effects Obtained by Present Disclosure]

(1) As shown in FIGS. 1 and 2, abnormal act information providing system 10 in accordance with the present disclosure includes the plurality of vehicles 100, and server 200 configured to communicate with vehicles 100. As shown in FIG. 2, each of vehicles 100 includes position detector 189 configured to detect a position of the vehicle, various sensors 160 configured to detect an act on the vehicle, and controller 181. As shown in FIG. 2, server 200 includes controller 210.

As indicated in S101 to S104 of FIG. 4, controller 181 of first vehicle 100 determines whether or not an act detected by various sensors 160 is an abnormal act that meets a predetermined condition. When controller 181 determines that the act is the abnormal act, controller 181 transmits, to server 200, abnormal act occurrence information including a position of the first vehicle detected by position detector 189. As indicated in S201 to S204 and S211 to S213 of FIG. 4, controller 210 collects the occurrence information transmitted from a plurality of the first vehicles as collected information, and transmits the collected information to second vehicle 100 to notify the user of second vehicle 100 of the collected information.

Thereby, the user of vehicle 100 can be notified of the collected information of the information on the occurrence of the abnormal acts on vehicles 100. As a result, the determination as the abnormal act on vehicle 100 can be utilized for other purposes.

(2) As indicated in S203 and S204 of FIG. 4, controller 210 specifies, using the collected information, a region where there are statistically more abnormal acts than those at other regions, and transmits the collected information to second vehicle 100 at the specified region to notify the user of second vehicle 100 of the collected information. Thereby, the user of vehicle 100 at the region where there are many abnormal acts on vehicles 100 can be notified of the collected information. As a result, the user can take measures against an abnormal act on vehicle 100.

(3) As shown in FIG. 2, vehicle 100 further includes notification device 184 configured to notify the user of information. Controller 210 transmits the collected information to second vehicle 100. As indicated in S105 and S106 of FIG. 4, controller 181 of second vehicle 100 controls notification device 184 to notify the collected information transmitted from server 200. Thereby, the collected information of the information on the occurrence of the abnormal acts on vehicles 100 can be notified at vehicle 100. As a result, the user driving vehicle 100 can take measures against an abnormal act on vehicle 100.

(4) As indicated in S204 and S213 of FIG. 4, controller 210 transmits the collected information to mobile terminal 400 of the user of second vehicle 100 to notify the user of the collected information at mobile terminal 400. Thereby, the collected information of the information on the occurrence of the abnormal acts on vehicles 100 can be notified at mobile terminal 400 of the user. As a result, even when the user is not at vehicle 100, the user can take measures against an abnormal act on vehicle 100.

(5) As indicated in S111 and S112 of FIG. 4, controller 181 of second vehicle 100 transmits, to server 200, position information indicating a position of the second vehicle detected by position detector 189. As indicated in S211 to S213 of FIG. 4, controller 210 transmits the collected information in the vicinity of the position indicated by the position information transmitted from second vehicle 100, to second vehicle 100. Thereby, the user can learn the collected information of the information on the occurrence of the abnormal acts on vehicles 100 upon request. As a result, the user driving vehicle 100 can take measures against an abnormal act on vehicle 100.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. An information providing system comprising:
   a plurality of vehicles; and
   a server configured to communicate with the plurality of vehicles,
   each of the plurality of vehicles including
      a notification device having a display configured to notify a user of information;
      a position detector configured to detect a position of the vehicle,
      a vehicle-mounted camera;
      a plurality of act detectors configured to detect one or more acts on the vehicle, and
      a vehicle-side controller,
   the server including a server-side controller,
   the plurality of vehicles including a first vehicle and a second vehicle,
   the vehicle-side controller of the first vehicle being configured to:
      determine whether or not an act detected by an act detector of the plurality of act detectors is an abnormal act that meets a predetermined condition, and
      when determining that the act is the abnormal act, transmit, to the server, abnormal act occurrence information including a position of the first vehicle detected by the position detector, the vehicle-side controller of the second vehicle being configured to:
   transmit, to the server, position information indicating a position of the second vehicle detected by the position detector,
the server-side controller being configured to
   collect the occurrence information transmitted from the first vehicle as collected information, and
   transmit the collected information to the second vehicle;
   specify, using the collected information, a region where there are statistically more abnormal acts than those at other regions, and
   transmit the collected information to the second vehicle at the specified region to notify a user of the second vehicle of the collected information transmitted from the server by displaying the collected information as an image on the display of the notification device.

* * * * *